United States Patent
Lorantfy et al.

(10) Patent No.: US 10,610,806 B2
(45) Date of Patent: Apr. 7, 2020

(54) TYPE OF EXTRACTION CELL FOR A CENTRIFUGAL PARTITION CHROMATOGRAPH, AS WELL AS A CENTRIFUGAL PARTITION CHROMATOGRAPH CONTAINING SUCH AN EXTRACTION CELL

(71) Applicant: ROTACHROM TECHNOLOGIAIKFT, Dabas (HU)

(72) Inventors: Laszlo Lorantfy, Dabas (HU); Laszlo Nemeth, Dabas (HU)

(73) Assignee: ROTACH ROM TECHNOLOGIAI KFT., Dabas (HU)

( * ) Notice: Subject to any disclaimer, the term of this patent is extended or adjusted under 35 U.S.C. 154(b) by 258 days.

(21) Appl. No.: 15/516,808

(22) PCT Filed: Oct. 1, 2015

(86) PCT No.: PCT/HU2015/050010
§ 371 (c)(1),
(2) Date: Apr. 4, 2017

(87) PCT Pub. No.: WO2016/055821
PCT Pub. Date: Apr. 14, 2016

(65) Prior Publication Data
US 2017/0296943 A1   Oct. 19, 2017

(30) Foreign Application Priority Data

Nov. 24, 2014 (HU) .................................... 1400552

(51) Int. Cl.
*B01D 15/18* (2006.01)
*B01D 15/22* (2006.01)
(Continued)

(52) U.S. Cl.
CPC ......... *B01D 15/1892* (2013.01); *B01D 15/22* (2013.01); *B01D 15/30* (2013.01);
(Continued)

(58) Field of Classification Search
CPC .... B01D 15/22; B01D 15/1892; B01D 15/30; G01N 30/42; G01N 30/6091; G01N 2030/381

See application file for complete search history.

(56) References Cited

U.S. PATENT DOCUMENTS 4,968,428 A    11/1990  Nunogaki
6,537,452 B1 *  3/2003  de La Poype ..... B01D 15/1892
                                                  210/198.2
(Continued)

FOREIGN PATENT DOCUMENTS

FR    2868165 A1    9/2005
FR    2883770 A1   10/2006
FR    2923398 A1    5/2009

OTHER PUBLICATIONS

International Search Report dated Feb. 9, 2016 issued in corresponding PCT/HU2015/050010 application (4 pages).
(Continued)

*Primary Examiner* — Benjamin L Lebron
(74) *Attorney, Agent, or Firm* — Millen White Zelano and Branigan, PC; Csaba Henter

(57) ABSTRACT

The object of the invention relates to an extraction cell (100) used in a centrifugal partition chromatograph, which has a cell wall (120) determining a closed extraction chamber (150), as well as an inlet (115) and an outlet (140) ensuring the fluid connection between the extraction chamber (150) and the space outside of the extraction cell (100) formed on essentially opposite parts of the cell wall (120).
The extraction cell (100) according to the invention is constructed asymmetrically from the point of view of the reversibility of the direction of flow used when the centrifugal partition chromatograph is in operation.

20 Claims, 6 Drawing Sheets

(51) Int. Cl.
*B01D 15/30* (2006.01)
*G01N 30/42* (2006.01)
*G01N 30/60* (2006.01)
*G01N 30/38* (2006.01)

(52) U.S. Cl.
CPC ......... *G01N 30/42* (2013.01); *G01N 30/6091* (2013.01); *G01N 2030/381* (2013.01)

(56) References Cited

U.S. PATENT DOCUMENTS

| | | |
|---|---|---|
| 7,553,421 B2 | 6/2009 | Foucault et al. |
| 8,182,690 B2 | 5/2012 | Foucault et al. |
| 2008/0035546 A1 | 2/2008 | Foucault et al. |
| 2010/0252503 A1 | 10/2010 | Foucault et al. |

OTHER PUBLICATIONS

Written Opinion of the International Searching Authority dated Feb. 9, 2016 issued in corresponding PCT/HU2015/050010 application (7 pages).
J-I Ikehata et al., "Effect of Coriolis Force on Counter-Current Chromatographic Separation by Centrifugal Partition Chromatography", Journal of Chromatography A, vol. 1025, No. 2 (2004) pp. 169-175.
English Abstract of FR 2883770 A1 published Oct. 6, 2006.

* cited by examiner

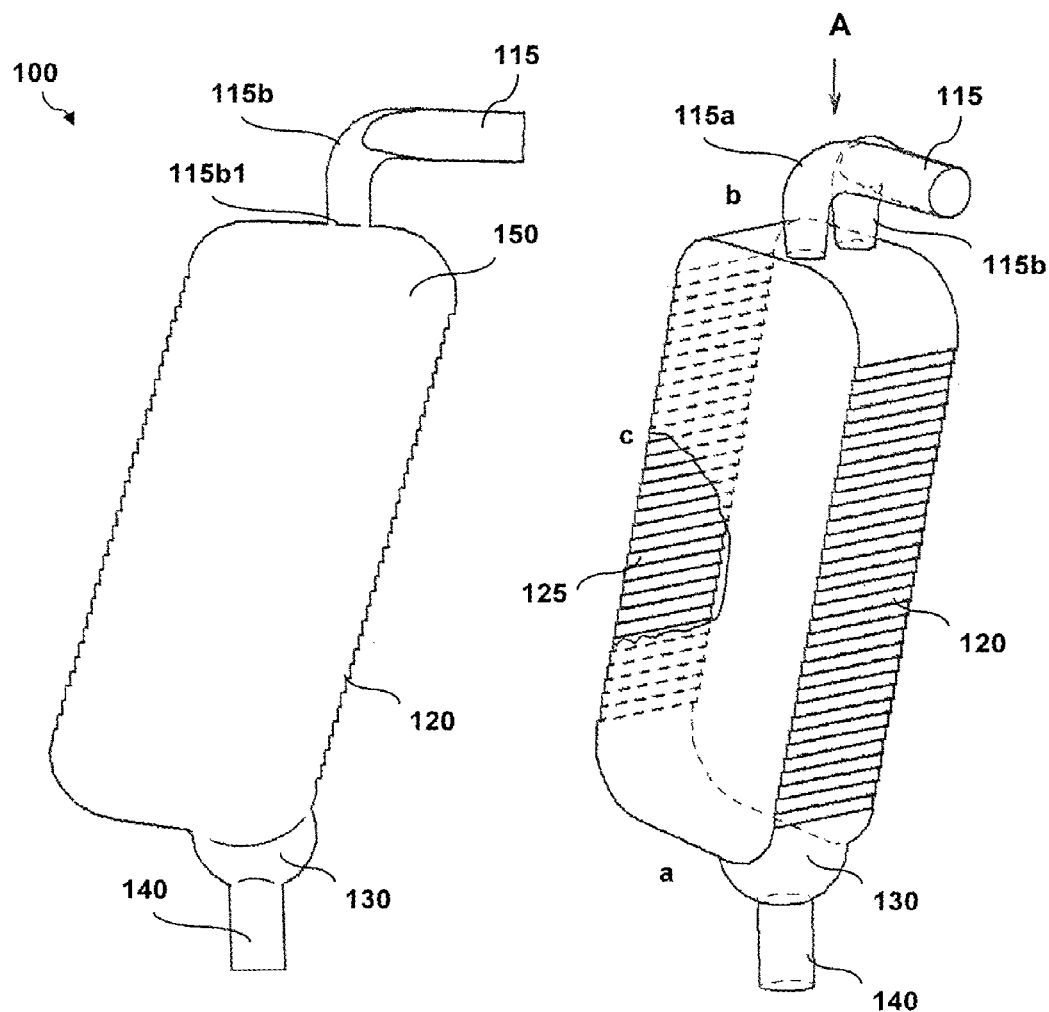
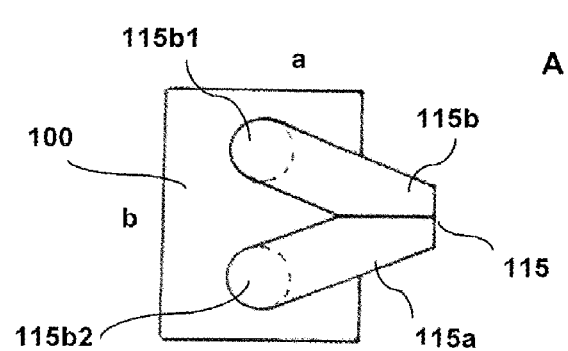
Fig.5
Fig. 6

TYPE OF EXTRACTION CELL FOR A CENTRIFUGAL PARTITION CHROMATOGRAPH, AS WELL AS A CENTRIFUGAL PARTITION CHROMATOGRAPH CONTAINING SUCH AN EXTRACTION CELL

The present invention relates to the field of the chromatographic separation of material mixtures. To be more specific, the object of the present invention is a novel type of extraction cell, especially for use in equipment for centrifugal partition chromatographs. The object of the invention also relates to a centrifugal partition chromatograph device containing a network of such extraction cells.

Centrifugal partition chromatography (CPC) is a chromatographic technique in which the stationary phase and mobile phase used to separate the material mixtures are both liquid phase materials. The area of application of the method is very wide: CPC is applicable for extracting compounds valuable on the market (such as various kinds of active pharmaceutical agents) and even hazardous materials (for example removing fatty acids with alkalis) from various media, with a high level of purity in a given case. FIG. 1 presents a simplified block diagram of CPC assemblies used today for implementing the method. According to this, in general centrifugal partition chromatograph assemblies include, as the main unit, a liquid pumping system for feeding the eluent, a sample feed unit serving to insert the material mixture to be separated, a CPC rotor that rotates around an axle, a detector and fraction collecting system, which are connected to one another in series in the order of the direction of flow by lines enabling the flow of liquid.

The CPC rotor represents an important component of CPC assemblies, and it is this component that differentiates the CPC technique from other liquid chromatography techniques. In the CPC rotor there is a network of a multitude of small, so-called extraction cells connected to one another preferably in series via appropriate channels, which network rotates around the axle of the CPC rotor. Numerous solutions exist for constructing the extraction cells and for connecting them into a network, which, without being exhaustive, include, for example US patents No. U.S. Pat. Nos. 6,537,452 and 8,182,690 B2, Japanese patent applications No. JPS629270 A and JP 2005/315787A, as well as U.S. patent applications No. US 2010/200488 A1 and no US 2009/173680 A1.

When separation is started the extraction cells are at least partially filled with the liquid phase material selected as the stationary phase. Significant centrifugal force is created in the extraction cells as a result of rotation. After the CPC rotor has been made to rotate, the liquid phase material selected to be the mobile phase starts to be pumped through the cell network. Depending on the relative densities of the stationary phase and the mobile phase the pumping direction is selected according to the following:
  if the stationary phase is the denser phase (this is the so-called ascendant mode), then the flow of the mobile phase progresses from the rotational circumference towards the rotational centre point, in other words towards the main axle of the CPC rotor;
  if the stationary phase is the less dense phase (this is the so-called descendent mode), then the flow of the mobile phase progresses from the rotational centre point towards the rotational circumference, as can be seen in FIG. 2, which provides a schematic view of the ideal operation (in other words disregarding the Coriolis force occurring due to the characteristics of the rotating system) of the extraction cell.

Due to the pumping, the mobile phase enters the extraction cell via the channel connected to the inlet of the extraction cell, which, from the point of view of the mobile phase, may be divided into three sections (which are presented below in connection with the descendent mode, however, a similar division is valid for the ascendant mode):

(1) In the upper part (first section) of the extraction cell outlined in FIG. 2, the mobile phase breaks down into tiny droplets in the stationary phase as long as the linear flow rate of the incoming liquid phase material exceeds the value that the Stokes model permits beside the physical-chemical parameters of the two phases and the actual field of force. In an ideal case at such a time the droplets are homogenously distributed throughout the cross-section of the cell.

(2) In the middle of the extraction cell according to FIG. 2 (second section) the mobile phase droplets flow through the stationary phase due to the larger centrifugal force exerted on them, while in this section the two phases come into contact with each other over a large surface area. In an ideal case, the two phases come into contact with each other from a point close to the inlet point up until the outlet point.

(3) In the lower part of the extraction cell according to FIG. 2 (third section), due to the construction of the cell and the difference in density between the two phases, the two phases separate from each other. The lighter (less dense) phase is propelled towards the inlet (upwards) by its buoyancy, while the the denser phase continues to be propelled towards the outlet (downwards) by the greater centrifugal force exerted on it. In an ideal case the mobile phase is present in the stationary phase only in the form of tiny droplets and not as coherent masses of material, and only the mobile phase leaves the cell.

The above processes are performed in the series-connected cells of a CPC rotor and are repeated from cell-to-cell. Therefore if the components of a mixture sample are fed into the liquid flow in the form of short liquid sections (i.e. as plugs), then the components characterised by differing partition coefficients become separated from each other in the extraction cells. The separation and its effectiveness may be characterised by generally used chromatography parameters well known from the literature, for example, by the theoretical plate number (N), the resolution between chromatography peaks ($R_s$) and the stationary phase volume ratio ($S_f$).

In reality the Coriolis force created as a consequence of the rotation and resulting from the characteristics of a rotating system must also be taken into account in the extraction cells of a rotating CPC rotor. The physical description of Coriolis force is known, and numerous scientific publications deal with its effect on the operation of CPC extraction cells, and, without being exhaustive, we may mention, for example, the publication by authors Jun-Ichi Ikehata et al. entitled "Effect of Coriolis force on countercurrent chromatographic separation by centrifugal partition chromatography" [*Journal of Chromatography A*, 1025, pp. 169-175 (2004)]; the work of authors Adelmann, Schwienheer and Schembecker entitled "Multiphase flow modeling in centrifugal partition chromatography" [*Journal of Chromatography A*, 1218, pp. 6092-6101 (2011)]; and the publication by authors Marchal, Foucault, Patissier, Rosant and Legrand entitled "Influence of flow patterns on chromatographic efficiency in centrifugal partition chromatography"

[*Journal of Chromatography A*, 869(1-2), pp. 339-352 (2000)]. The effect of Coriolis force exerted on the flow in CPC extraction cells can be easily visualised using software simulation (e.g. the OpenFOAM software package); numerous conclusions may be drawn with respect to the operation of the cells on the basis of the flow pattern obtained in this way.

On the basis of the above mentioned work by Jun-Ichi Ikehata et al. it is known that atomisation is not homogenous throughout the entire cross-section of the cell in the case of the cell structures used today due to the effect of the Coriolis force, because a proportion of the droplets are deviated due to the effect of the Coriolis force. Extraction cannot take place with maximum effectiveness in inhomogeneous droplet distribution. Apart from this, the droplets deviated due to the effect of the Coriolis force impact the sidewall of the cell and then simply trickle down it, which significantly reduces the size of the contact interface between the two phases.

At the same time the effect of the Coriolis force may be viewed as increasing the contact interface between the two phases via mixing the mobile phase with the stationary phase. After studying the flow pattern of the flow in the cell obtained via a simulation test accepted in the profession, it becomes obvious that the Coriolis force elicits back-mixing in a CPC extraction cell, the circular flow created mixes up the liquid already settled, which is a strongly degrading factor from the point of view of extraction, because as a result of the back-mixing an elemental separation step output is fed back to the input stage, as a result of which chromatographic separation efficiency is significantly reduced. The simulated flow pattern according to FIG. 3 illustrates such back-mixing (see the arrow marked) in an extraction cell in use today with a cell axis at a given angle) (33° to the rotational radius of the CPC rotor (a so-called tilted axis cell) for the purpose of counteracting the effect of the Coriolis force (at 1400 rpm, with a 15 ml/min. flow rate and a cell distance i.e. rotational radius of r=105.5 mm measured from the centre of rotation).

On the basis of the work carried out by Marchal et al. referred to above, it may also be seen that the size of the contact interface has an effect on the chromatographic parameter of theoretical plate number (N), while the settling efficiency influences the stationary phase volume ratio ($S_f$). At the same time the obvious performance indicator of the chromatographic method is represented by resolution between peaks ($R_s$), which is a function of both of the aforementioned parameters. A person skilled in the art is also aware that the theoretical plate number may be increased with flow rate, however, the stationary phase volume ratio drops. According to the publication by authors Schwienheer, Merz and Schembecker entitled "Evaluation of CPC separation efficiency for different types of chamber geometries on the basis of flow pattern and separation experiments" [*Journal of Chromatography A*, CCC2014, under publication (2014)] by changing the cell geometry it is possible to attempt to improve the aforementioned two parameters (N and $S_f$); however, the extensive simulation tests performed by the aforementioned authors show that it is not possible to simultaneously improve both these parameters for the extraction cells widely in use today: in all cases an improvement in the one parameter involves a deterioration in the other, and vice versa.

Such behaviour is exhibited in FIGS. 4A and 4B depicting simulation tests of two differing, currently used cell geometries. According to the flow pattern presented in FIG. 4A, the large contact interface between the stationary phase and mobile phase may be achieved by reducing the mobile phase volume ratio (hereinafter: dead volume). According to the flow pattern illustrated in FIG. 4B increasing the flow rate leads to a marked increase in dead volume.

In the light of the above, it is an accepted viewpoint that all of the desirable functions of the CPC extraction cells available today, i.e. their atomisation efficiency, extraction efficiency and their effect on the prevention of back-mixing, may not be simultaneously improved, in other words these three functions are, in practice, viewed as competing functions.

According to this, there is a need for a CPC extraction cell that, during operation, is simultaneously and equally effective with respect to all three functions —i.e. as an atomisation device, an extraction device and settling device—as only with such a cell may the efficiency of chromatographic separation be improved. Our objective with the present invention is to create such a new type of extraction cell for use in the CPC rotor of a CPC assembly.

It is a widely held view today in the field of CPC that the roles of the stationary and mobile phases may be interchanged, and, furthermore, by changing the direction of flow through the CPC rotor, a complete change of direction may be achieved. This may actually be preferable in those cases when the chromatographic separation of material mixtures is required and all of the components to be separated are needed, and the components in question have very different partition coefficients. As a result of the requirement of reversibility the inlets and outlets of the individual extraction cells in the currently available CPC rotors can be interchanged, therefore these cells from this point of view, in other words from the point of view of reversibility, are symmetrical. Here, it should be noted that in the majority of cases, and mainly in pharmaceutical industry active agent purification processes, there is no need for this, as in such cases there is a main component that is to be extracted, while the other components are viewed as contaminants, and so their recovery is not the objective, only their separation from the main component.

On the one part, during our investigations we arrived at the surprising result that from the point of view of atomisation a small cross-section cell inlet is preferable, while from the point of view of settling a large cell outlet is preferable, in other words a CPC extraction cell that is asymmetrical from the point of view of reversibility of flow direction provides better flow as compared to a similarly constructed symmetrical extraction cell. Accordingly, the inlet and outlet of the asymmetrical CPC extraction cell according to the invention have different cross-sections.

On the other part, during our investigations we arrived at the surprising result that the contact interface between the stationary phase and the mobile phase is significantly increased if—deviating from the traditional structure—the two facing sidewalls have a roughened internal surface instead of a smooth surface. From the point of view of roughening, it is especially preferable if the surface is given a step-like or saw tooth-like surface structure.

During our investigations we also found that by suitably selecting the geometry of the CPC extraction cell, back-mixing in the cell can be minimised, also the stationary phase volume ratio and the contact interface between the two phases can be maximised. To do this the cell geometry used today is preferably changed so that a collection pool is formed between the extraction space of the cell and its outlet.

Apart from this, if the outlets and inlets of the CPC extraction cells according to the invention, as well as the channels connecting the individual cells are manufactured with standard chromatography connections, then the disassembly of the CPC rotor made from them becomes very simple, and also the possibility of leakages and other faults drops to a minimal level.

Furthermore, the rotation radius of the extraction cells of the CPC rotors widely used today is usually a maximum of 300 mm, usually between 50 mm and 300 mm. The main reason for this is that, almost without exception, the extraction cells in question are arranged on a disc with an annular circular cross-section; in practice the cells are formed in the material of the disc by CNC machining (e.g. milling, cutting). CNC machines with larger work spaces are, on the one hand, exceptionally expensive, and, on the other hand, they do not have a sufficiently rigid frame, therefore when machining larger sized discs the machining head may vibrate, which may result in imprecise machining and, therefore, imprecise cells. Therefore, the manufacture of widely used, disc-type CPC rotor structures with large dimensions, i.e. with a rotational radius well exceeding 300 mm, is very complicated. A further disadvantage of disc-type CPC rotors is that the materials leaking between the discs and the sealing plates used when assembling CPC rotors from them when the rotors are operating results in the rotors becoming contaminated, which is unacceptable in the light of the pharmaceutical industry's strict quality assurance prescriptions. This fact significantly prevents the use of CPC rotors in the pharmaceutical industry. This is especially true above a certain size limit (internal volume of 10 litres), as due to pharmaceutical industry prescriptions separating several types of material one after the other in the same CPC assembly is only possible after shutting down the assembly, completely disassembling the CPC rotor, thoroughly cleaning each and every component, and then assembling it once again. However, the prescribed cleaning process means a loss of production time, which is especially significant in the case of large, high-capacity CPC rotors, where the primary aspect is productivity. The deterioration in the dimension precision of CNC machining when producing larger radius discs makes this problem even worse.

In the light of all this then, there is a need for a CPC rotor that may be economically and, mainly, precisely manufactured even with a larger disc size or rotational radius, and that is also not burdened by the above technical problems.

In this respect, during our investigations we came to the surprising conclusion that the effect of the Coriolis force exerted in the extraction cells is reduced in harmony with the increase of the rotational radius r of the CPC rotor—with the physical definition of Coriolis force $$F_{coriolis} = -2m\left(\sqrt{\frac{a_{centripetiles}}{r}} \times v\right)$$

in other words it may be preferable if the rotational radius of the CPC rotor (i.e. the distance from the centre point axis of the rotor to the position where the extraction cells are positioned) were to be made relatively large, exceeding the 300 mm used today.

According to our investigations, for this it is preferable if the production technology is amended in accordance with the size of the work space of the available CNC machines or 3D printers, and if the production of the entire annular circular cross-section disc carrying the extraction cells takes place in the form of several segments combinable into a disc after manufacture instead of a single work-piece, where the individual segments comply with the size of the work space of the available tradition CNC machines or 3D printers, therefore by making effective use of this, the imprecision appearing in CNC machines or 3D printers with larger work spaces can be avoided.

If the angle of the division of the entire disc into identical segments is represented by x, according to our investigations dependent on the division angle x, the size of the work space required to produce a segment with the centre point angle x (either with a CNC machine or 3D printer) may be described with the following relationship:

$$\sqrt{1 - \cos(x)} - \sqrt{\frac{1 - \cos^2 x}{2}}$$

An analysis of this results in that the maximum centre point angle of the individual segments (forming segments containing extraction cells, the channels linking them and further connectors) may be a maximum of 90°, as the ratio between the volume taken up by the cells and the total gross volume required for manufacture starts to increase significantly above this value. The entire disc forming the CPC rotor is preferably produced from 4-30 pieces, and from 4-12 segments in an optimal case, which following this are combined in a known way by a person skilled in the art to make a disc-shaped CPC rotor. Selecting the number of segments to be greater than this will mean that too few extraction cells can be formed in each segment from the point of view of optimal operation. Selecting the number of segments to be fewer than this, will mean that the capacity and separation variability of the extraction cells formed in each segment will drop. In the case of the modular construction in question, the distance of the extraction cells measured from the rotational centre point, in the case of the division used, is between 300 and 1000 mm, and between 400 and 500 mm in an optimal case.

BRIEF DESCRIPTION OF THE DRAWINGS

In the following the invention is presented in detail with reference to the attached drawing, where

FIG. 5 shows an example of a preferable embodiment of a new-type asymmetrical CPC extraction cell produced using FDM 3D printing technology in longitudinal cross-section, as well as in a schematic, partially cutaway perspective view;

FIG. 6 is the top view of the CPC extraction cell illustrated in FIG. 5, viewed from the direction of the arrow indicated in FIG. 5;

Consecutively FIGS. 5 and 6 show an example of a preferable embodiment of a new-type asymmetrical CPC extraction cell 100 in longitudinal cross-section in partially cutaway perspective view and in outline top view. This embodiment of the extraction cell 100 is preferably produced using FDM ("fused deposition modelling") 3D printing technology, although—as is known to a person skilled in the art—it may also be produced using lost core injection moulding. Preferably e.g. peek, i.e. poly[phenyl-(4-phenylene doxy phenyl)ketone resin is used for the 3D printing, although other inert materials suitable for performing 3D printing may also be used, which is obvious for a person skilled in the art. The extraction cell 100 with its geometry to be detailed below is primarily suitable for carrying out CPC processes where the rate of flow of the mobile phase is a maximum of 250 ml/minute.

Figure 1:
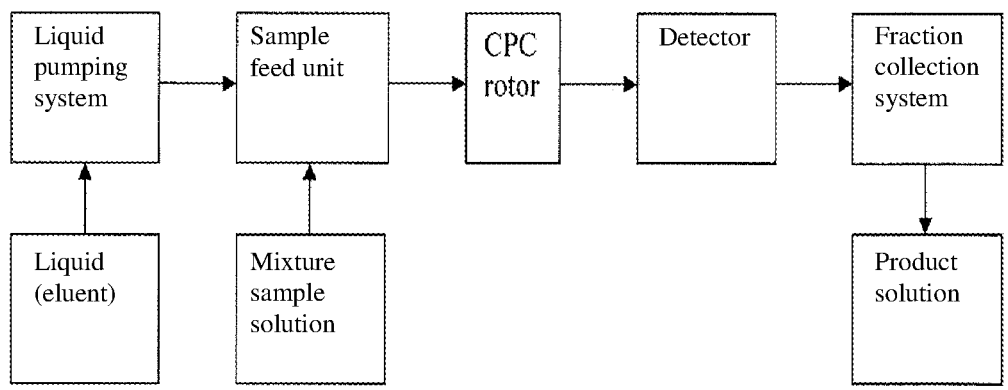
FIG. 1 is a block diagram of a CPC assembly used today for performing CPC-based separation procedures, where the arrows represent the flow of the liquid between the components of the assembly and its direction.
Figure 2:
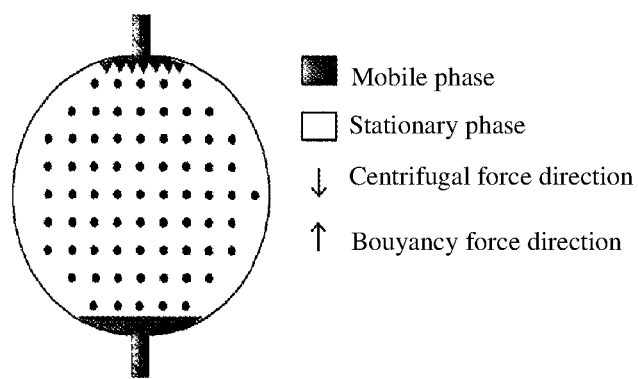
FIG. 2 is a schematic illustration of the operation of the extraction cell used in the CPC rotor unit of the CPC assembly according to FIG. 1.
Figure 3:
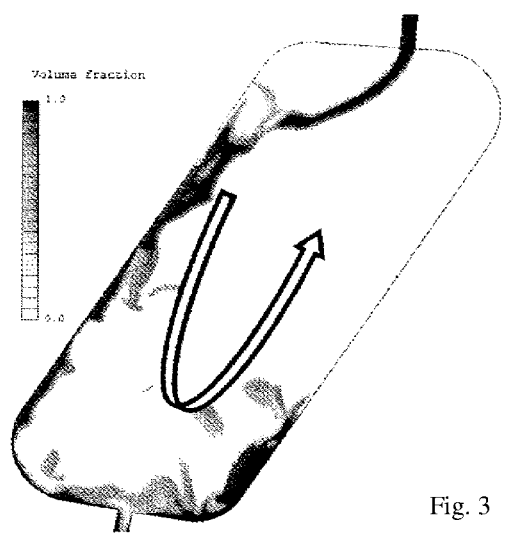
FIG. 3 shows the simulated flow pattern in a known extraction cell, which illustrates the damaging back-mixing effect in the cell of the Coriolis force (marked with an arrow)
Figure 4A:
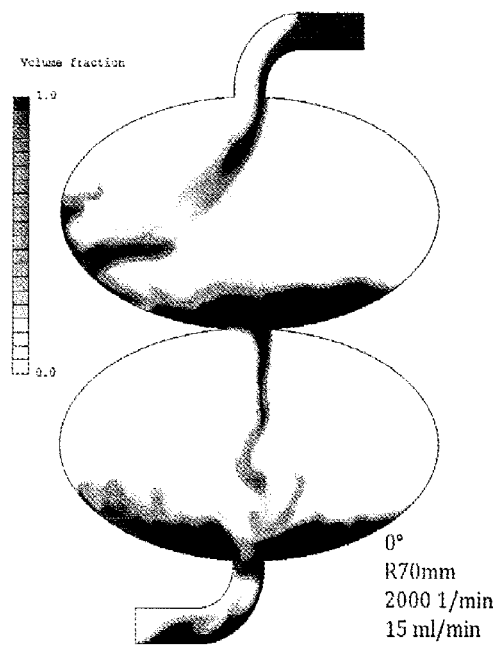
FIGS. 4A and 4B are simulated flow patterns, which illustrate how the chromatographic parameters compete with one another in the case of two different cell geometries in use today.
Figure 4B:
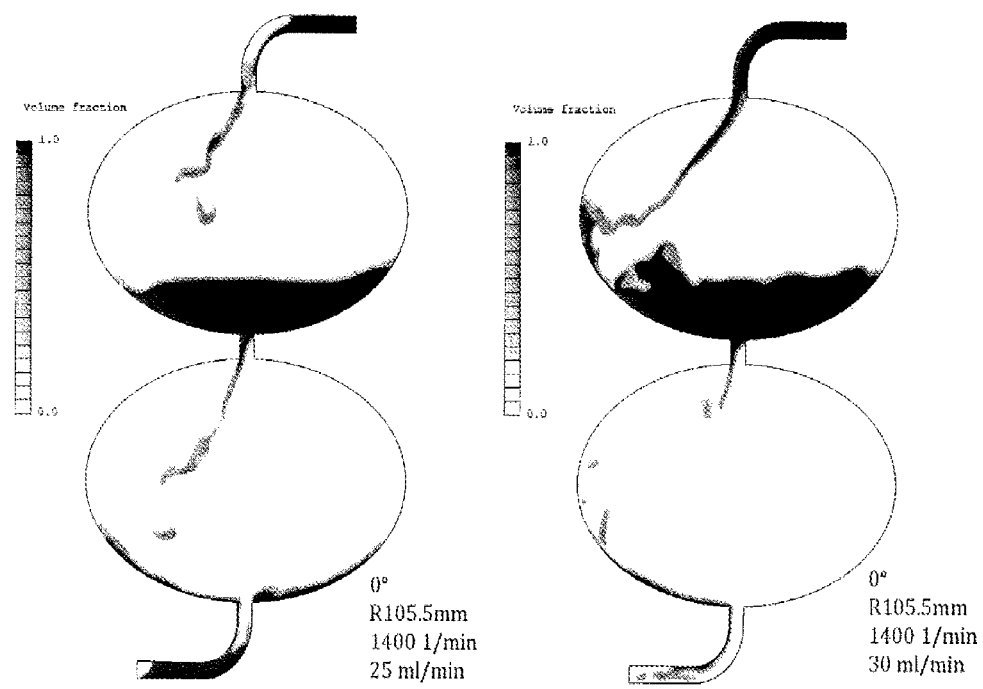
Figure 7A:
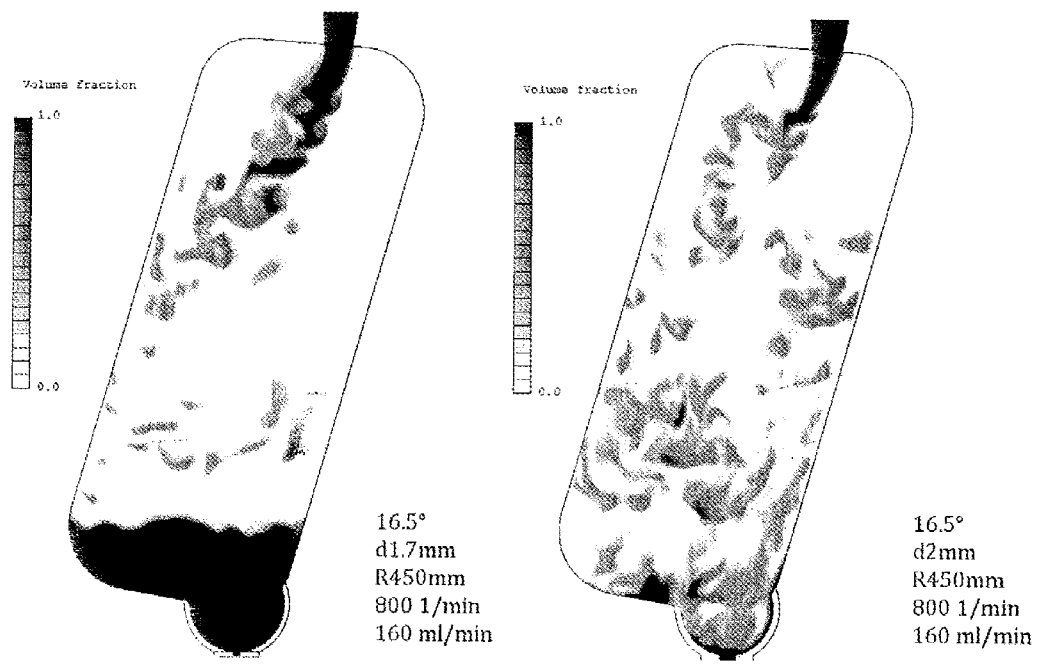
FIGS. 7A and 7B are the simulated (SC/Tetra v11 software package) flow patterns occurring in the CPC extraction cell according to FIG. 5 with different outlet cross-sections (1.7 mm and 2.0 mm; the left hand and right hand image in FIG. 7A respectively), and with different cell axis tilts (16.5° and 20.0°, the left hand and right hand image in FIG. 7B respectively); beside the designated parameter the other parameters used in the simulation remained unchanged in both cases.
Figure 7B:
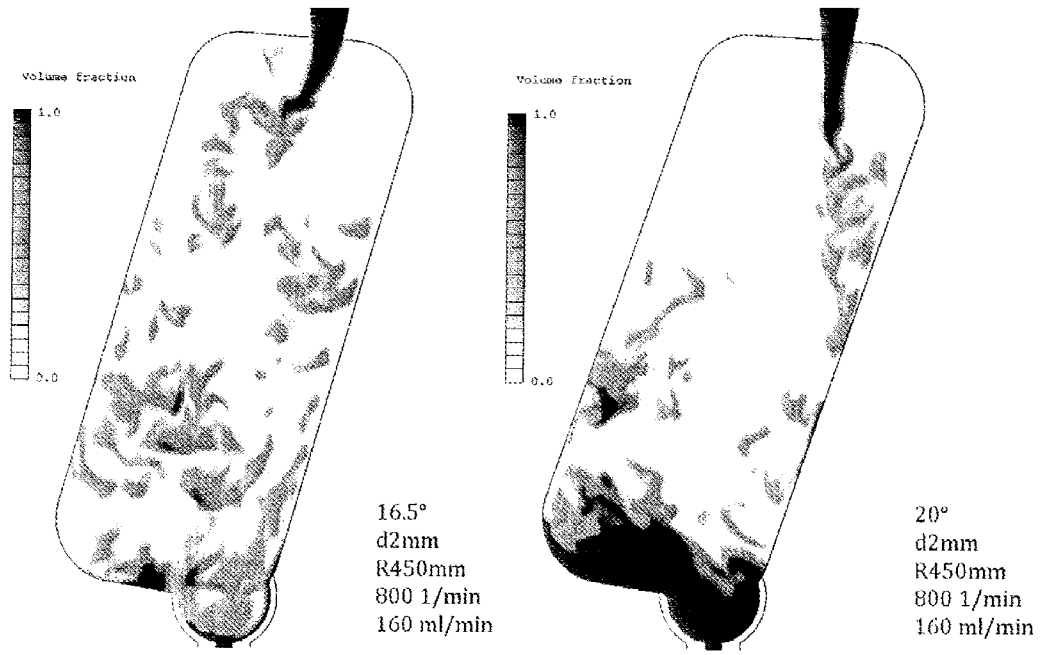

The extraction cell 100 has a cell wall 120 marking out the extraction chamber 150, which may be basically viewed as a three-dimensional shape with width "a", thickness/depth "b" and height "c", the dimensions of which preferably comply with the following relationships a≥b≥0.5a and 3a≥c≥2a. The three-dimensional shape is preferably a rectangular-based, inclined prism, specially a parallelepiped, at least the edges of which perpendicular to the a-c plane are rounded; in the case of a parallelepiped shape the geometric axis of the extraction cell 100 (not depicted in the drawing) when in its position in the CPC rotor (operation state) points essentially in the direction of the centre point of the CPC rotor (see the centre point O of the CPC rotor 400 constructed as an annular disc presented in FIG. 10), i.e. it coincides with the radius of the CPC rotor. At the same time, in its position in the CPC rotor (operation state), the geometric axis of the extraction cell 100 essentially in the shape of an inclined prism is at a determined angle to the radial line drawn from the centre point O of the CPC rotor to the geometric centre point of the extraction cell 100 (tilted cell); this angle is preferably selected so that the Coriolis force resulting from the rotation exerts the least possible effect on the flow occurring in the extraction cell 100 while in operation. Consequentially, from the point of view of the Coriolis force occurring in it during operation, the extraction cell 100 having such a tilted geometric axis can be treated as being optimised. In the light of the simulation tests performed aimed at determining the cell flow pattern, the angle of tilt of the extraction cell (depending on the length of the rotational radius and the planned speed of rotation of the CPC rotor) falls between 5° and 30°; with a rotational radius of 450 mm and a speed of rotation of 750 1/min. the angle of tilt of the extraction cell 100 is preferably between 15° and 18°, and even more preferably 16.5°.

The extraction chamber 150 of the extraction cell 100 has an inlet 115 and an outlet 140. The inlet 115 is structured so as to be divided into one or more inlet branches, where each inlet branch is connected to the extraction chamber through a circular inlet opening. Every one of these inlet openings is the same size, their diameters are preferably between 0.5 mm and 1.0 mm. Particularly, FIGS. 5 and 6 show an extraction cell 100 that has two inlet branches 115a, 115b, and, accordingly, two inlet openings 115a1, 115b1. According to our investigations, the inlet 115 may be preferably divided into between two and ten inlet branches; the number of inlet branches is preferably between two and four, and is most preferably two. The inlet branches used open into the extraction chamber 150 perpendicularly. The centre points of the inlet openings belonging to the inlet branches are essentially located along a straight line, the straight line in question lies in the a-b plane and is essentially perpendicular to the width "a" of the extraction cell 100. The one or more inlet openings of the extraction cell 100 are essentially formed halfway along the width "a" of the cell, this position may be changed by a maximum of ±10% along the width "a" of the cell.

According to the simulation tests, the branching of the inlet 115 has a positive effect on the flow pattern occurring in the cell during operation. From a closer aspect, the division of the inlet 115 into several inlet branches improves atomisation, in other words, it increases the size of the contact interface between the two phases present in the extraction cell 100, due to which the rate of material transport in the cell accelerates, which in practice, from the point of view of chromatography, means an increase in plate number.

The internal surfaces 125 of the extraction cell 100 according to the invention defined by the planes b-c are preferably not smooth but roughened. The roughening is preferably formed by steps or saw teeth created on the surfaces 125, the height of which is preferably between 0.1 mm and 0.4 mm. According to our investigations, the roughening of the internal surfaces 125 slightly increases the atomisation of the mobile phase and reduces the adhesion of the mobile phase to the surfaces 125.

The outlet 140 of the extraction cell 100 has one branch, i.e. it is not divided, also it has a circular cross-section. The size of the flow cross-section of the outlet 140 always exceeds the flow cross-section of an individual inlet branch. The simulation tests aimed at determining the flow pattern have clearly proven that an outlet 140 larger than the inlet 115 significantly reduces the dead volume occurring in the extraction cell 100.

From the point of view of reversibility of flow direction, the extraction cell 100 according to the invention is asymmetric, in other words, when performing CPC processes, the direction of flow in the cell cannot be reversed. The asymmetric construction is a result of the different cross-sections of the outlet 140 and the inlet branches as well as due to there being a collection pool 130 of a determined size established between the extraction chamber 150 and the outlet 140. As a result of this, the liquid phase leaving the extraction chamber 150 flows through this collection pool 130 before leaving through the outlet 140. In the light of the simulation tests, the collection pool 130 in question is preferably hemispherical, the radius of which hemisphere exceeds the diameter of the outlet 140, however, it is smaller than any of the "a", "b" and "c" dimensions of the body containing the extraction cell 100. The diameter of the collection pool 130 is preferably equal to a half of the width "a" of the extraction cell 100.

Using the outlet 140 with the collection pool 130 significantly reduces the amount of back-mixed mobile phase, and also improves the settling efficiency, i.e. the mobile phase volume drops. This, from a chromatography point of view, reduces dead volume ratio and increases the stationary phase volume ratio. The solution in question also makes a greater flow rate possible, which increases the theoretical plate number and, with the increase in speed, increases the productivity of the CPC assembly.

On the basis of the simulation results (see Table 1), the technical solutions according to the invention, beside reducing dead volume, increase the size of the contact interface between the stationary and mobile phases, therefore two competing parameters are simultaneously improved.

As opposed to this, the currently available solutions were able to increase the size of the interface by increasing the flow rate of the mobile phase, which involved a significant increase in dead volume. On the basis of this, it is easy to see that in the case of the extraction cell 100 according to the invention, the peak resolution ($R_e$), which characterises its separation ability, increases.

TABLE 1

Comparison of small volume extraction cells
(planned for a 250 ml CPC column volume)

| Cell | Rotational radius (mm) | Speed of rotation (rpm) | Flow rate (ml/min.) | Specific interface ($m^{-1}$) | Mobile phase volume ratio |
|---|---|---|---|---|---|
| Reference (Kromaton) | 105 | 1400 | 15 | 581 | 13.35% |
| Reference (Armen) | 70 | 200 | 15 | 885 | 17.24% |
| Own 3D FDM cell | 550 | 750 | 15 | 1007 | 9.36% |
| Own 3D FDM cell | 550 | 750 | 20 | 1307 | 12.15% |

Figure 8:
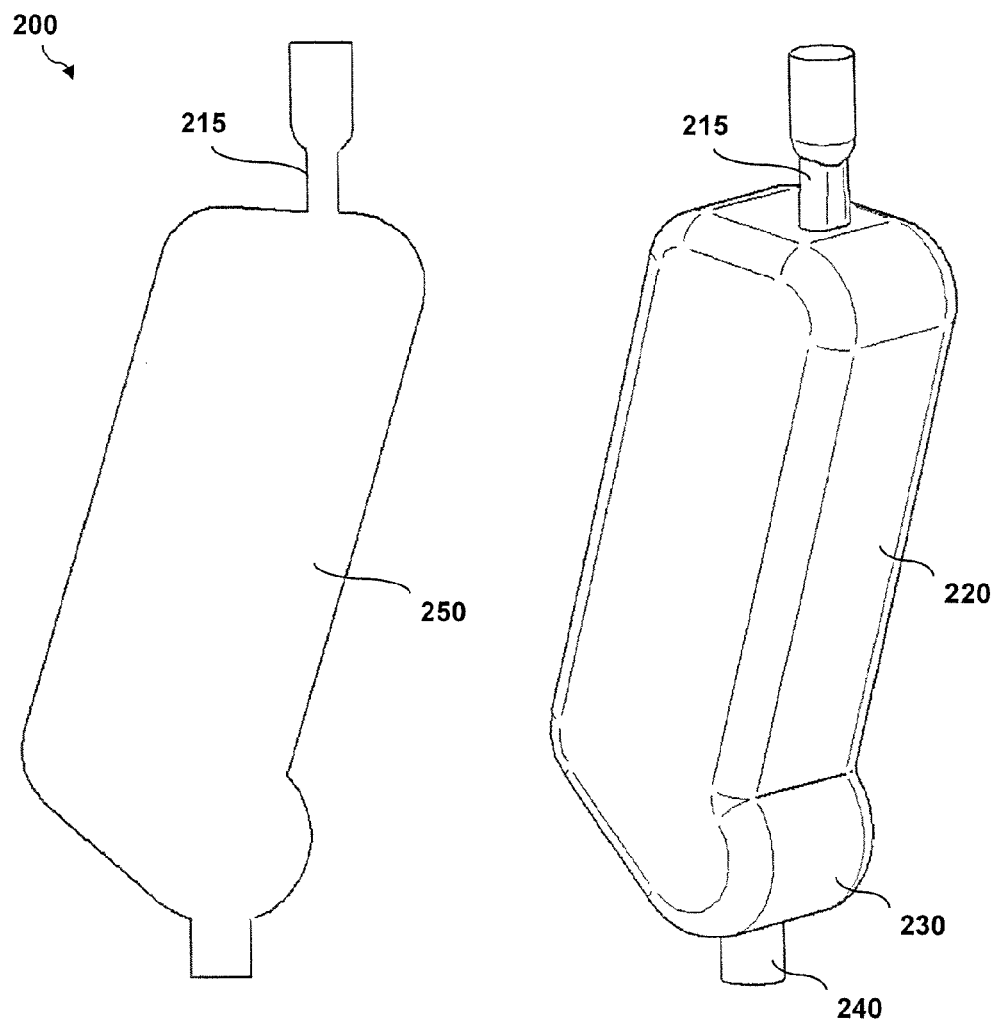
FIG. 8 shows an example of a preferable embodiment of a new-type asymmetrical CPC extraction cell produced using CNC milling in longitudinal cross section as well as in a schematic, perspective view.

FIG. 8 depicts an example of another preferable embodiment of a new type asymmetrical CPC extraction cell 200 according to the invention in longitudinal cross-section and in perspective outline view. This embodiment of the extraction cell 200 is preferably produced from peek material plates using CNC milling. The production work process is, to a certain extent, similar to the method presented in the US publication document No. US2010/0200488, where the halves of the cells are milled in individual plates, then following this, the whole cells are created by clamping together the two plates containing the two half-cells.

As compared to this solution, the main difference of the production process used by us is that the plates containing the milled cell halves are coated with a thin layer of a fluoropolymer (for example, by the heat-actuated continued polymerisation of a partially polymerised dispersion), then the coated plates are clamped together and subjected to heating, due to which the molecules of the polymer coating partially diffuse into one another and they adhere to one another forming appropriate insulation/sealing. In this way a single component is created in which the problem of leakage of the solutions between the layers does not appear.

With respect to its geometry, the extraction cell 200 obtained in this way is very similar to the extraction cell 100 presented previously. The extraction cell 200 is primarily suitable for performing CPC processes where the flow rate of the mobile phase is a maximum of 1000 ml/min. The structure of the extraction cell 200 is very similar to the extraction cell 100 presented in FIG. 5. Accordingly, the cell wall 200 of the extraction cell 200 determines an extraction chamber 250, which extraction chamber 250 has an inlet 215 that opens into the extraction chamber 250 essentially perpendicularly, as well as an outlet 240 that serves to permit the liquid phase to leave the extraction chamber 250.

The inlet 215 may have one or more inlet branches, where all the inlet branches are each connected to the extraction chamber 250 via a circular inlet opening. All of the inlet openings in question are of the same size, their diameter is preferably between 0.5 mm and 1.0 mm. Particularly, FIG. 8 shows an extraction cell 200 that has one inlet branch and, accordingly, one inlet opening.

The outlet 240 of the extraction cell 200 is also single-branched, i.e. it is not divided and also has a circular cross-section. The flow cross-section of the outlet 240 exceeds the flow cross-section of the inlet. From the point of view of reversibility of flow direction, the extraction cell 200 according to the invention is also asymmetric, in other words, when performing CPC processes, the direction of flow in the cell cannot be reversed. The asymmetric construction is a result of the different cross-sections of the outlet 240 and the inlet 215, as well as due to there being a collection pool 230 of a determined size established between the extraction chamber 250 and the outlet 240. As a result of this, the liquid phase leaving the extraction chamber 250 flows through this collection pool 230 before leaving through the outlet 240. In the light of the simulation tests, the collection pool 230 in question, unlike the hemispherical collection pool 130 used in the case of extraction cell 100, preferably designates an inclined surface extending along the entire width of the bottom of the extraction chamber 250, which inclined surface is connected to the cell wall 240 without any distinct angles.

On the basis of the simulation tests performed (see Table 2) the extraction cell 200 according to the invention produced by CNC milling and by being fused together has significant advantages as compared to the currently available cells, as beside reducing dead volume, it increases the size of the contact interface between the stationary and mobile phases, therefore two competing parameters are simultaneously improved. Apart from this, it is able to operate at a much larger flow rate as compared to the volume of the cell, therefore, its productivity is much higher than the productivity of traditional cells.

TABLE 2

Comparison of medium volume cells (planned
for a 1 liter CPC column volume)

| Cell | Rotational radius (mm) | Speed of rotation (rpm) | Flow rate (ml/min.) | Specific interface ($m^{-1}$) | Mobile phase volume |
|---|---|---|---|---|---|
| Reference (Armen) | 105 | 1400 | 25 | 241 | 10.09% |
| Reference (Armen) | 105 | 1400 | 30 | 333 | 25.19% |
| Own (No. 21) | 450 | 750 | 275 | 824 | 16.43% |
| Own (No. 22) | 450 | 750 | 200 | 638 | 13.5% |

Figure 9:
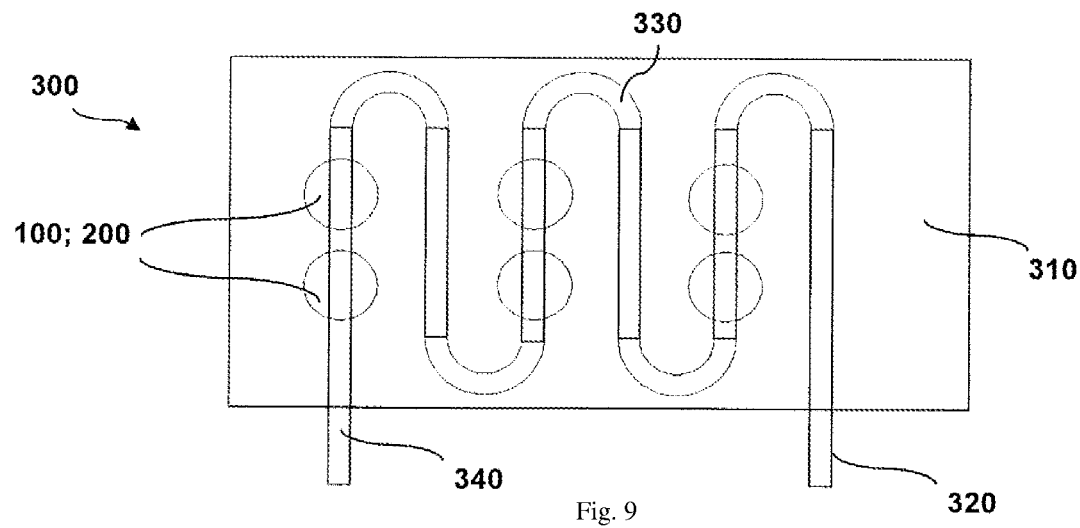
FIG. 9 shows a schematic depiction of a module of a modularly constructed CPC rotor according to the invention containing several CPC extraction cells according to the invention linked closely together.

FIG. 9 depicts a module 300 of a modularly constructed CPC rotor according to the invention containing several CPC extraction cells 100, 200 connected to each other in series. The module 300 in question has channels 330 providing fluid links for the extraction cells 100, 200 formed on a carrier 310 or in the carrier 310 as well as a single liquid input 320 and a single liquid output 340.

Figure 10:
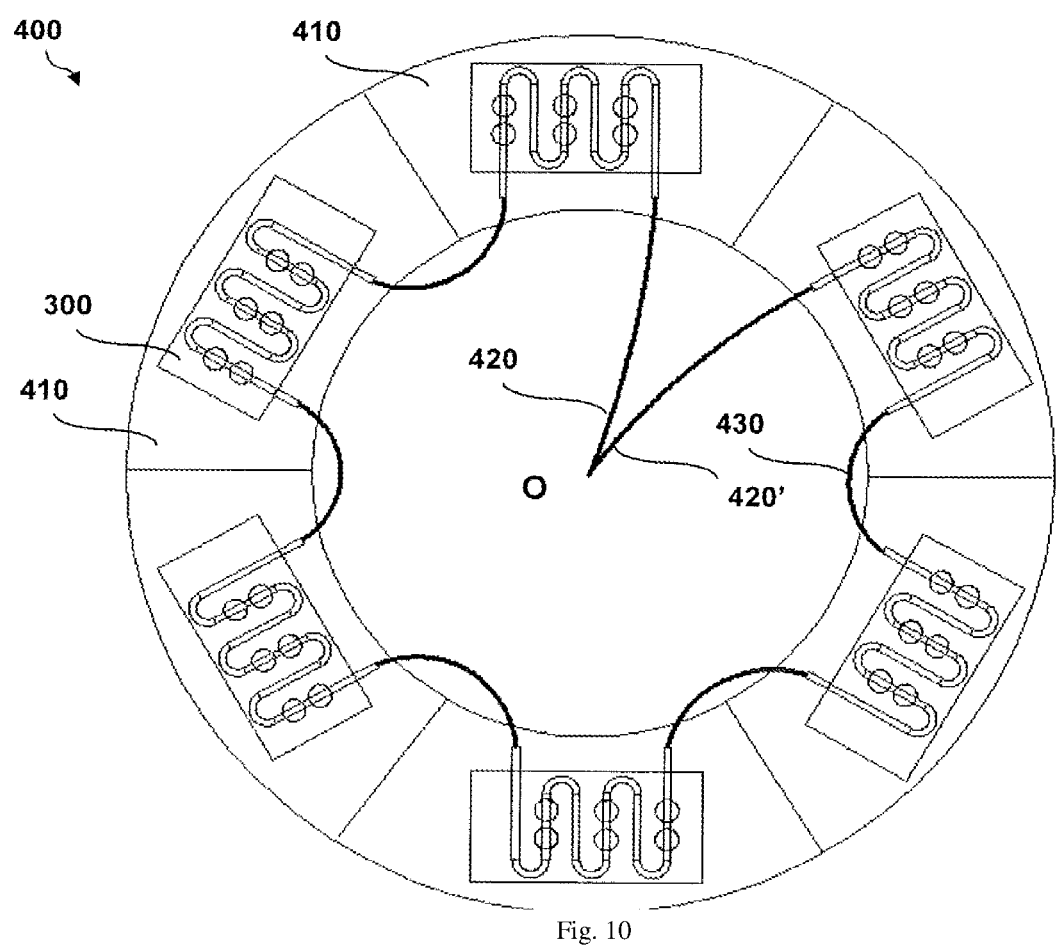
FIG. 10 depicts a large sized (r>300 mm) disc CPC rotor constructed using the CPC rotor modules depicted in FIG. 9 with an annular cross-section.

FIG. 10 depicts a large (r>300 mm) disc CPC rotor 400 with an annular cross-section constructed using the CPC rotor modules 300 depicted in FIG. 9. The modules 300 positioned on the sector segments 410 of the CPC rotor 400 are connected in series through tubes 430, where the liquid input of a selected module 300 is connected by tube 420 preferably to the liquid inlet located at the main axis of the CPC rotor 400, while the liquid outlet of the neighbouring module 300 is preferably connected by tube 420' preferably to the liquid output located at the main axis of the CPC rotor 400.

In the case of the CPC rotor 400 according to the invention, the sum total of the extraction cells, channels and connections is produced from a single piece by plastic FDM 3D printing, or using similar technology. With this it is possible for the cell network to be made from fewer connected pieces as compared to the solutions according to the state of the art. This construction has the following advantages:

- The shape of the cells may be any chosen shape in the three dimensions, and in this way it may become possible to introduce the cell geometry discussed later on.
- The cross-section of the channels connecting the cells may be circular, instead of the previous rectangular cross-section, which reduces the pressure drop caused by the viscosity of the liquid, as well as the volume of the channels, which, to use a chromatography expression, counts as dead volume.
- It overcomes the fault of the liquid leaking in between the discs and the fluoropolymer seal between them due to the effect of the high pressure, which causes a transfer of contaminants between separation processes taking place at different times.
- In the past the discs and the seals had to be very precisely positioned with respect to one another, which greatly hindered assembly and servicing.

Implementation using plastic FDM 3D printing technology is very similar to a CNC process (3 or more axis robot), however, it is not a subtractive but an additive process, due to which the amount of waste created is significantly less, therefore this production process is more environmentally friendly and economical. Similarly to CNC procedures, devices suitable for working on large pieces are either very expensive or do not have the required degree of precision and speed.

It is easy to realise that the series of cells positioned in annular circular sector shapes may have an external housing, with the help of which the elements may be easily positioned into an annular disc.

The invention claimed is:

1. An extraction cell (100, 200) for a centrifugal partition chromatograph, comprising a cell wall (120, 220) determining a closed extraction chamber (150, 250), as well as an inlet (115, 215) and an outlet (140, 240) ensuring a fluid connection between the closed extraction chamber (150, 250) and a space outside of the extraction cell (100, 200) formed on essentially opposite parts of the cell wall (120, 220), wherein the extraction cell (100, 200) has an asymmetrical structure from the point of view of reversibility of flow direction when the centrifugal partition chromatograph is in operation, and wherein the inlet (115, 215) is formed as at least two inlet branches (115a, 115b).

2. The extraction cell (100, 200) according to claim 1, wherein the inlet (115, 215) and the outlet (140, 240) have different cross-sections.

3. The extraction cell (100, 200) according to claim 1, wherein the flow cross-section of the outlet (140, 240) is greater than the flow cross-section of the inlet (115, 215).

4. The extraction cell (100, 200) according to claim 1, wherein the inlet (115, 215) is formed as two to ten inlet branches (115a, 115b).

5. The extraction cell (100, 200) according to claim 1, wherein the cell wall (120, 220) forms an essentially rectangular based inclined prism, the angle of tilt of which, with the extraction cell (100, 200) in its position in the centrifugal partition chromatograph, being selected to minimise the Coriolis force occurring as a result of the rotation when the extraction cell (100, 200) is in its operation state.

6. The extraction cell (100, 200) according to claim 5, wherein the angle of tilt is between 5° and 30°.

7. The extraction cell (100) according to claim 1, which is produced by fused deposition modelling 3D printing technology.

8. The extraction cell (200) according to claim 1, wherein the collection pool (230) is formed as a part of the cell wall (220) extending in an inclined way in the direction of the outlet (240).

9. A centrifugal partition chromatograph, which contains at least one extraction cell (100, 200) according to claim 1.

10. The centrifugal partition chromatograph according to claim 9, which has a modular construction realised with essentially identical modules (300), where all of the modules (300) contain more than one extraction cell (100, 200) connected by channels (330) providing a fluid connection between said more than one extraction cell (100, 200), furthermore the individual modules (300) are connected in series with each other via tubes (430).

11. The extraction cell (100, 200) according to claim 5, wherein the angle of tilt is between 15° and 18°.

12. An extraction cell (100, 200) for a centrifugal partition chromatograph, comprising a cell wall (120, 220) determining a closed extraction chamber (150, 250), as well as an inlet (115, 215) and an outlet (140, 240) ensuring a fluid connection between the closed extraction chamber (150, 250) and a space outside of the extraction cell (100, 200) formed on essentially opposite parts of the cell wall (120, 220), wherein the extraction cell (100, 200) has an asymmetrical structure from the point of view of reversibility of flow direction used when the centrifugal partition chromatograph is in operation, and wherein the extraction chamber (150, 250) is connected to the outlet (140, 240) via a collection pool (130, 230), and wherein at least one of the following conditions is satisfied:

- the collection pool (130) is formed as a protruding hemispherical part of the cell wall (120), and the outlet (140) is located on this hemisphere, and/or
- the collection pool (230) is formed as a part of the cell wall (220) extending in an inclined way in the direction of the outlet (240) and which extraction cell is produced by combining two half cells obtained by CNC milling, where the surfaces of the cell halves touching each other are coated with a fluoropolymer.

13. The extraction cell (100) according to claim 12, wherein the collection pool (130) is formed as a protruding hemispherical part of the cell wall (120), and the outlet (140) is located on this hemisphere.

14. The extraction cell (200) according to claim 12, wherein the collection pool (230) is formed as a part of the cell wall (220) extending in an inclined way in the direction of the outlet (240), and which extraction cell is produced by combining two half cells obtained by CNC milling, where the surfaces of the cell halves touching each other are coated with a fluoropolymer.

15. A centrifugal partition chromatograph, which contains at least one extraction cell (100, 200) according to claim 12.

16. The centrifugal partition chromatograph according to claim 15, which has a modular construction realised with essentially identical modules (300), where all of the modules (300) contain more than one extraction cell (100, 200) connected by channels (330) providing a fluid connection between said more than one extraction cell (100, 200), furthermore the individual modules (300) are connected in series with each other via tubes (430).

17. An extraction cell (100, 200) for a centrifugal partition chromatograph, comprising a cell wall (120, 220) determining a closed extraction chamber (150, 250), as well as an inlet (115, 215) and an outlet (140, 240) ensuring a fluid connection between the closed extraction chamber (150, 250) and a space outside of the extraction cell (100, 200) formed on essentially opposite parts of the cell wall (120, 220), wherein the extraction cell (100, 200) has an asymmetrical structure from the point of view of reversibility of flow direction used when the centrifugal partition chromatograph is in operation, and wherein at least a part of the surface (125) of the cell wall (120) bordering with the extraction chamber (150) is roughened.

18. The extraction cell (100) according to claim 17, wherein the roughening is ensured by steps or saw teeth on the surface (125).

19. A centrifugal partition chromatograph, which contains at least one extraction cell (100, 200) according to claim 17.

20. The centrifugal partition chromatograph according to claim 19, which has a modular construction realised with essentially identical modules (300), where all of the modules (300) contain more than one extraction cell (100, 200) connected by channels (330) providing a fluid connection between said more than one extraction cell (100, 200), furthermore the individual modules (300) are connected in series with each other via tubes (430).

\* \* \* \* \*